United States Patent

Jauhola et al.

[11] Patent Number: 5,950,672
[45] Date of Patent: Sep. 14, 1999

[54] TWIN FILTER FOR COMPRESSED AIR

[75] Inventors: Lauri Jauhola, Luotipussi 16, FIN-40630 Jyväskylä, Finland; Tero Nikkilä, Haapaniemi, Finland

[73] Assignee: Lauri Jauhola, Finland

[21] Appl. No.: 08/981,556

[22] PCT Filed: May 28, 1996

[86] PCT No.: PCT/FI96/00300

§ 371 Date: Dec. 5, 1997

§ 102(e) Date: Dec. 5, 1997

[87] PCT Pub. No.: WO96/39240

PCT Pub. Date: Dec. 12, 1996

[30] Foreign Application Priority Data

Jun. 6, 1995 [FI] Finland ..................... 952758

[51] Int. Cl.⁶ ..................................... B01D 35/12
[52] U.S. Cl. .................... 137/549; 137/599.1; 210/136
[58] Field of Search ................... 137/110, 112, 137/113, 545, 549, 599.1; 210/134, 136

[56] References Cited

U.S. PATENT DOCUMENTS

| | | | |
|---|---|---|---|
| 1,253,344 | 1/1918 | Braun | 137/545 X |
| 2,466,304 | 4/1949 | Cooney | 210/136 |
| 2,566,609 | 9/1951 | Grosse | 137/549 X |
| 3,051,188 | 8/1962 | Tilney | 137/599.1 |
| 3,951,802 | 4/1976 | Derouinear | 137/599.1 X |
| 4,003,397 | 1/1977 | Cooper | 137/599.1 X |

Primary Examiner—Stephen M. Hepperle
Attorney, Agent, or Firm—Jones & Askew

[57] ABSTRACT

A twin filter for compressed air, in which there are two filters set in parallel and an arrangement of valves to direct compressed air through a selected filter. The arrangement of valves includes inlet valves to distribute compressed air from the inlet to the selected filter and an arrangement of counter-valves to direct the compressed air from the selected filter to the compressed air outlet. The arrangement of counter-valves includes a ball chamber formed in the housing structure, at the ends of which are inlet connections and an outlet connection in the center. A ball is arranged to close that inlet connection in which there is no pressure. The ball chamber has a filter element in the central area of which a ring-like outlet channel is formed, which collects the outlet flow to the outlet connection.

10 Claims, 3 Drawing Sheets

TWIN FILTER FOR COMPRESSED AIR

The object of the invention is a twin filter for compressed air, in which there are two filters set in parallel and a set of valves for directing the compressed air through the selected filter, the set of valves including inlet valves to distribute the compressed air from the inlet to the selected filter and an arrangement of counter valves to direct the compressed air from the selected filter to the compressed air outlet, which arrangement of counter valves consists of two counter valves that are set opposite one another and are connected to one another by a chamber, to which valves are connected inlet connections and an outlet connection, and in which a ball is arranged to close the unpressurized inlet connection. The invention is also concerned with an arrangement of counter valves for other purposes.

Modern compressed air filters use synthetic cylindrical pipes, elements, which are set into the water-removal cup, when the compressed air filter can also separate water, in addition to filtering. Filter elements of this type are made by several manufacturers, among them the American company Numatics, Mich. Such filter elements are made with different grades of coarseness, so that it is possible to speak of, for example, a 5 $\mu$ element. This means that such an element will not permit particles with a diameter greater than 5 $\mu$ to pass through it. The element filter must be changed now and then, when the pressure loss across it becomes too great to use. The flow through the filter must then be cut. Twin filters are therefore used for uninterrupted air distribution, these having two filters set in parallel in such a way that, with the aid of a suitable arrangement of valves, the flow can be switched from one side to the other. A blocked filter can then be changed at the same time as the flow continues unbroken through the other filter.

In one known twin filter, there is a T-piece, after which there are various shut-off valves, by means of which the flow can be manually opened to the desired side and correspondingly shut off from the other side. There is a danger that the operator may close both shut-off valves. On one side of the filters two spring-loaded counter-valves are used, in both of which a ball moves in a pressure chamber formed by a drilled hole, both chambers being connected to the other by a connecting drilled hole. Channels are led from the filter to the ends of the ball chamber while the flow exits from the middle of the connecting hole. The spring then closes the opposite counter-valve, shutting the valve that has been cut off. However, a counter-valve arrangement of this kind limits the flow.

This invention is intended to create a new kind of twin filter for compressed air, which has new characteristics compared to known twin filters, while also making the operation of a twin filter easier, without the risk of operating errors.

The characteristic features of a twin filter for compressed air according to the invention are described in the accompanying claims. It is most advantageous, if the cage structure that carries the ball is formed by a filter element that is as such known, but mechanical structures are also possible in principle. A filter element can be used to create a suitable pressure loss, which will drive the ball reliably to the other end.

A twin filter according to the invention together with a filter element used in the ball chamber also provides the additional advantage that, if filter elements run out, for a short period there is still the pressure chamber coarse filter left after the filter proper, which is in any event preferable to a break in operation or a total lack of any filter. Other advantages and embodiments of the invention appear later.

In what follows, the invention is illustrated by reference to the accompanying Figures, which show one twin filter for compressed air in accordance with the invention.

Figure 1:
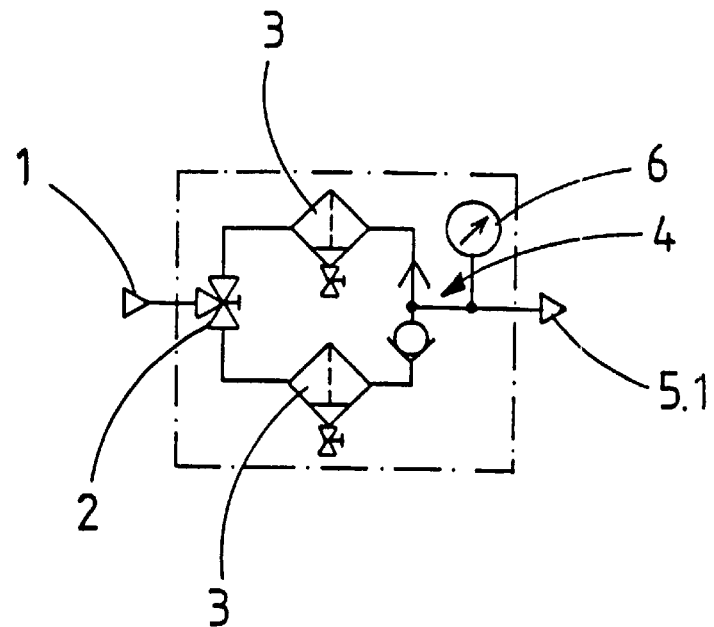
FIG. 1 shows the flow diagram for a twin filter for compressed air according to the invention.
Figure 2:
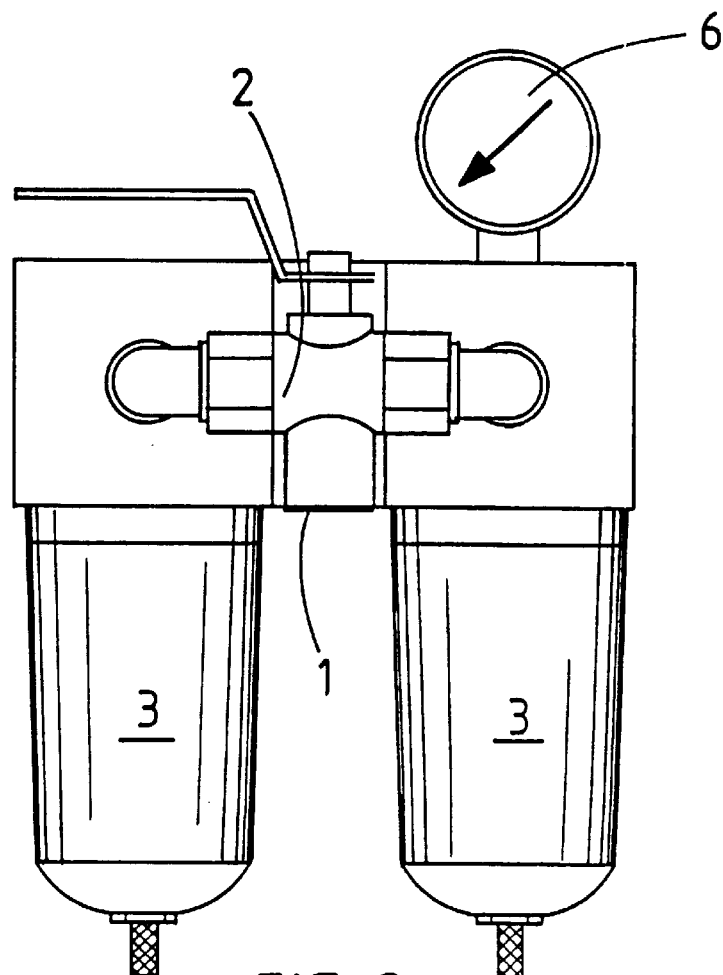
FIG. 2 shows front view of a compressed air filter according to the invention.
Figure 3:
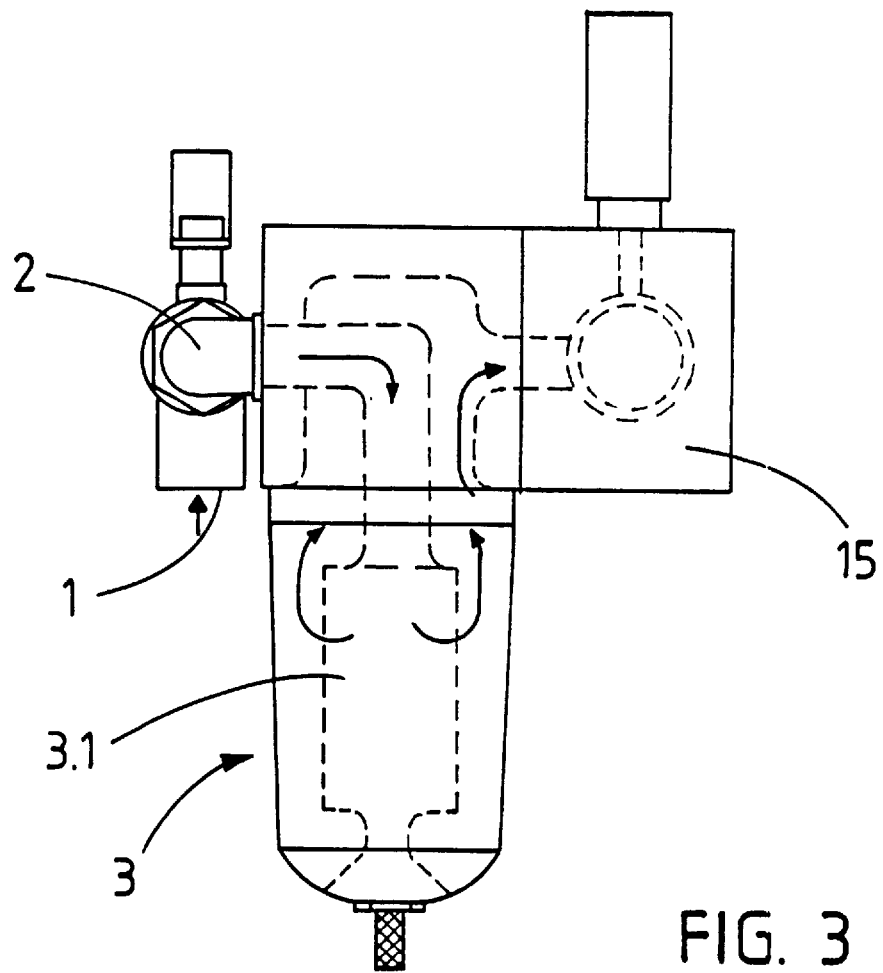
FIG. 3 shows a side view of the twin filter in FIG. 1.

The main components of the twin filter comprise two proper filters 3, an inlet valve 2 connecting them, and a casing component 15, in which there is a valve arrangement 4 formed by a crossover counter-valve. The compressed air inlet 1 is a direct inlet to a three-way valve. In this way, instead of two separate valves, a three-way valve is used as the inlet valve 2, which has the additional property that it does not cut off the air in the intermediate position, but instead the change takes place smoothly. In the intermediate position, the compressed air feed thus comes through both filters. In valves of this kind, there may be for example a T-channel ball.

Figure 4:
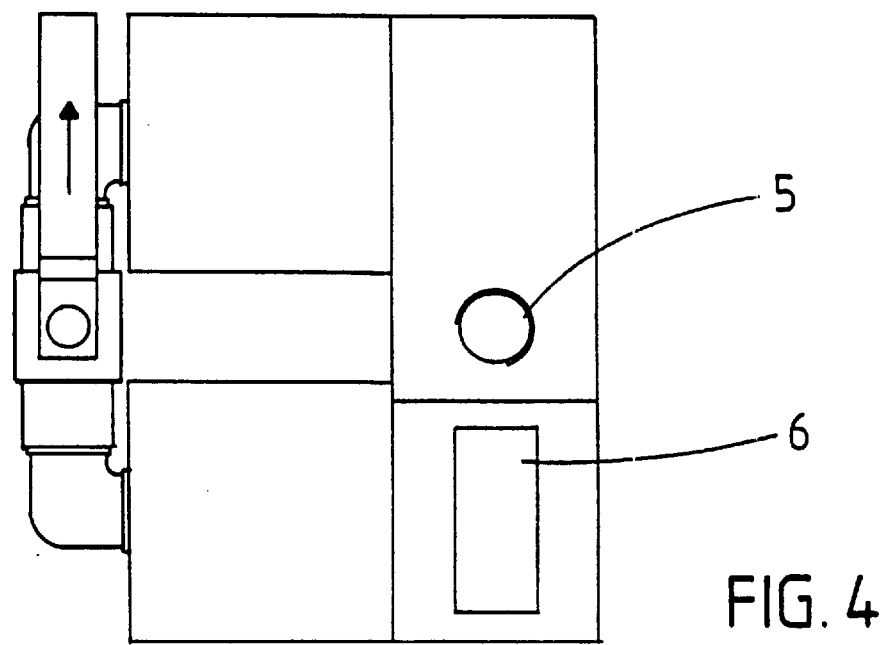
FIG. 4 shows a top view of the twin filter in FIG. 1.
Figure 5:
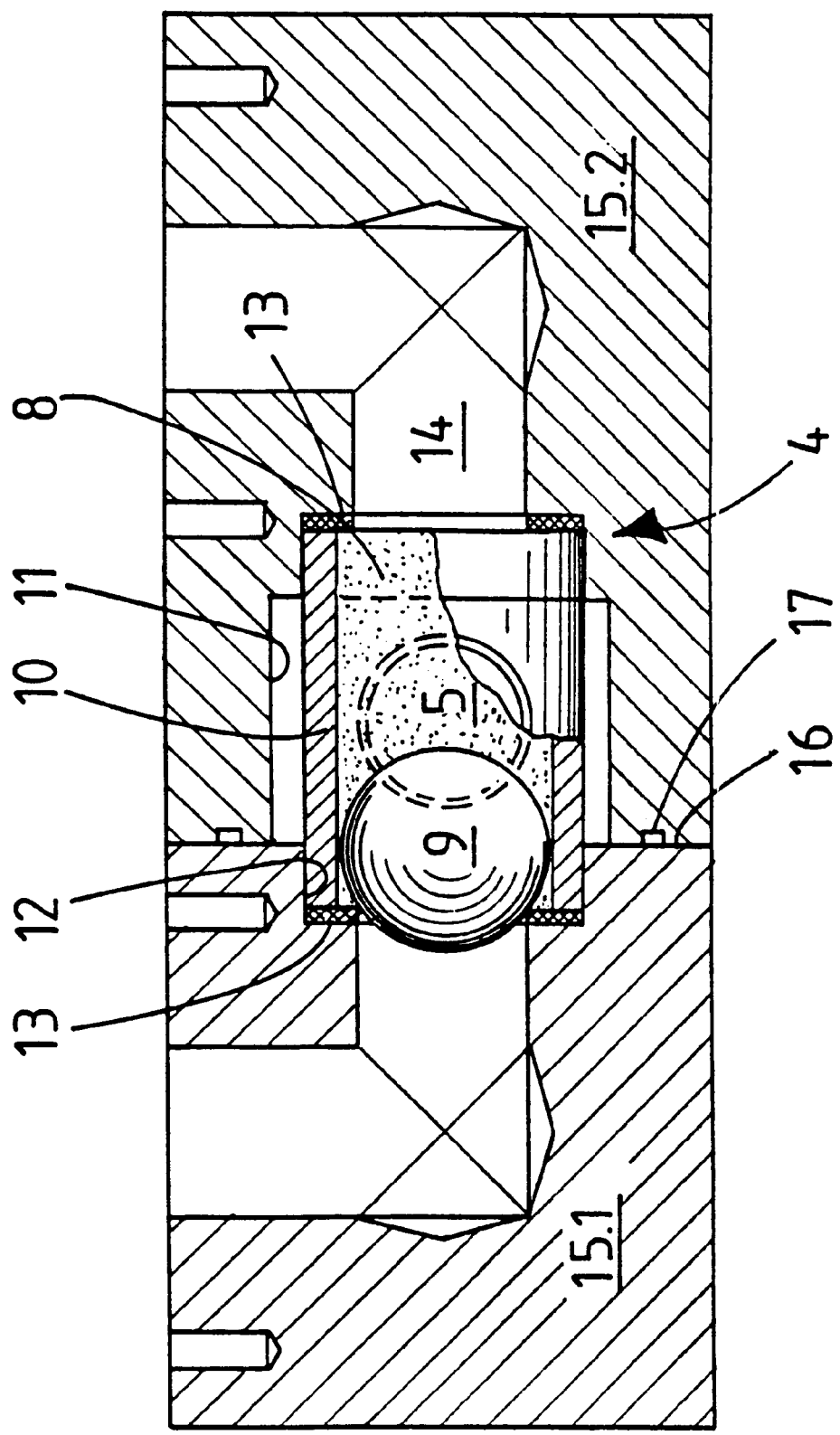
FIG. 5 shows a cross-section of the ball chamber housing.

In both filters 3, the aforementioned filter element 3.1, which has typically a coarseness grade of 5 $\mu$, is used. The air enters the ball chamber housing through the channels in casing component 15. With reference to FIG. 4, the outlet from the ball chamber housing takes place through the outlet connection 5, located in the centre. The outlet pressure is monitored with the aid of meter 6, which shows if the filter becomes blocked, so that the compressed air feed must be switched through the other element, which has been changed earlier.

Casing component 15 is advantageously formed from two parts 15.1 and 15.2, in which case the machining required is fairly simple. The casing component has holes 14 drilled axially in both parts of the housing. There are cylindrically machined linings 10 for the filter element parallel to the drilled holes 14. In the larger piece 15.2, there is a concentric cylindrical machining for the outlet channel 11. The outlet connection 5 extends to this outlet channel 11. When the casing component 15 is assembled, the parts 15.1 and 15.2 are set opposite each other in such a way that the filter 10 and the flat ring gaskets 13 at its ends remain in the cylindrical space 12. In addition, the ball 9 is naturally placed inside element 10. Ring gasket 17 is used in the distribution level 16 between parts 15.1 and 15.2. The counter-valves are formed at the ends of the same chamber when ball 9 acts as a shut-off member at each end in turn.

If the coarseness of the proper filters is 5 $\mu$, a filter element 10 with a coarseness of, e.g. 40 $\mu$ is used in this ball chamber. Filter element Numatics type EKF30A has been tested. This means that in an emergency there need not be any filter in the twin filter, all filtration being taken care of by this coarser filter element 10. Naturally, situations of this kind should be avoided, because changing filter 10 will cause a break in flow. The coarseness of the filter element should be 2–50 times greater than in the proper filter, and should be generally in the range 5–200 $\mu$.

During operation, the flow from the pressure side pushes the ball 9 against the edges of the opening of the drilled hole 14 of the opposite inlet connection. The flat ring gasket 13 extends, however, to the edges of the opening in such a way that the ball is never in direct contact with the edges of the opening.

In summary, it can be stated that a twin filter according to the invention has the advantage of providing more reliable operation by eliminating an operating error, in which both separate valves are closed simultaneously. The three-way valve used never shuts the flow into the intermediate position, so that the change of the filter element takes place without a break in flow. The crossover counter valve according to the invention permits a greater flow than previously through the ball chamber, while also providing possible additional filtering for a situation in which the proper filter element is blocked and a new element is not available.

It is naturally possible to use the counter-valve arrangement according to the invention elsewhere than in a twin filter. It can be used to control two inlet sources entering the same line.

We claim:

1. A twin filter for compressed air, in which there are two filters (3) set in parallel and an arrangements of valves (2, 4) to direct compressed air through a selected filter (3), which arrangement of valves includes inlet valves (2) to distribute compressed air from an inlet (1) to the selected filter (3) and an arrangement of counter-valves (4) to direct the compressed air from the selected filter to a compressed air outlet (5.1), which arrangement of counter-valves (4) includes two counter-valves opposing each other and connected to one another by a chamber (8), to which the inlet connections (14) are connected with an outlet connection (5) in the centre, and in which a ball (9) is arranged to close that inlet connection (14) in which there is no pressure, characterized in that the chamber (8) comprises a cylindrical cage structure to carry the ball and an outlet channel 11 encompassing the cage structure, in which chamber the counter-valves are formed at the ends of this chamber, while the ball acts as a shut-off member at each end in turn, and the outlet connection (5) extends to the outlet channel (11).

2. A twin filter in accordance with patent claim 1, characterized in that the cage structure is formed by a filter element (10) that has a ring-like outlet flow from an outer surface of the filter element into the outlet connection (5).

3. A twin filter in accordance with Patent claim 2, characterized in that the ball chamber consists of longitudinal holes drilled to the inlet connections (14), a cylindrical space (12) with a greater diameter than these for the element (10), and a central cylindrical machining (11) of still greater diameter for the central outlet channel.

4. A twin filter in accordance with Patent claim 3, characterized in that at each end of the element (10) a flat ring gasket (13) is used, which extends around the opening of the corresponding inlet connection (14), so that the flat ring gasket (13) remains between the ball (9) and the edge of the opening.

5. A twin filter in accordance with claim 2, characterized in that the filtration limit of the ball chamber filter element (9) is for particles 2–50 times greater than the proper filters.

6. A twin filter in accordance with claim 2, characterized in that the aforementioned housing structure is in two parts, with the distribution level (16) located at the end of the ring-like outlet channel (11).

7. A twin filter in accordance with claim 2, characterized in that the inlet valves are formed by a single three-way valve (2), in which there is a T-channel ball or similar arranged in such a way that the feed changes smoothly from one side to the other without closing in the intermediate position.

8. A compressed air counter-valve arrangement (4) for leading compressed air from a selected inlet connection (14) to an outlet (5.1), which counter-valve arrangement consists of two counter-valves set opposite one another and linked to each other by a chamber (8), to which valves the inlet connections (14) are connected with an outlet connection (5) to the centre, and in which a ball (9) is arranged to close that inlet connection (14) that has no pressure, characterized in that the ball chamber (8) is formed by a filter element (10) that is, as such, known, and in which the counter-valves are formed in the ends of the same chamber, with the ball acting as a closing member at each end in turn, and in which there is a ring-like outlet channel (11) formed in the central area of the chamber, which collects the outlet flow into the outlet connection (5).

9. A counter-valve arrangement (4) in accordance with Patent claim 8, characterized in that at each end of the element (10) a flat ring gasket (13) is used, which extends round the opening of the corresponding inlet connection (14), so that the flat ring gasket (13) remains between the ball (9) and the edge of the opening.

10. A counter-valve arrangement 94) in accordance with claim 1, characterized in that the aforementioned housing structure is in two parts with the distribution level (16) located at the end of the ring-like outlet channel (11).

* * * * *